US006616284B2

(12) United States Patent
Yaniv et al.

(10) Patent No.: US 6,616,284 B2
(45) Date of Patent: Sep. 9, 2003

(54) DISPLAYING AN IMAGE BASED ON PROXIMITY OF OBSERVER (75) Inventors: Zvi Yaniv, Austin, TX (US); Michael C. Sweaton, Austin, TX (US)

(73) Assignee: SI Diamond Technology, Inc., Austin, TX (US)

(*) Notice: Subject to any disclaimer, the term of this patent is extended or adjusted under 35 U.S.C. 154(b) by 0 days.

(21) Appl. No.: 10/186,312

(22) Filed: Jun. 28, 2002

(65) Prior Publication Data

US 2003/0011754 A1 Jan. 16, 2003

Related U.S. Application Data (63) Continuation-in-part of application No. 09/876,400, filed on Jun. 7, 2001.

(51) Int. Cl.[7] .............................................. G03B 21/14
(52) U.S. Cl. ......................... 353/79; 353/122; 359/443
(58) Field of Search ............................... 353/28, 79, 88, 353/122; 349/11, 12, 16; 359/443, 449; 348/586, 590, 607

(56) References Cited

U.S. PATENT DOCUMENTS

| 3,650,608 | A | * | 3/1972 | Baker ........................... 353/69 |
| 5,123,192 | A | | 6/1992 | Hsieh ........................... 40/442 |
| 5,175,637 | A | | 12/1992 | Jones et al. .................... 359/48 |
| 5,416,617 | A | | 5/1995 | Loiseaux et al. ............. 359/51 |
| 5,644,369 | A | * | 7/1997 | Jachimowicz et al. ........ 349/10 |
| 5,784,138 | A | | 7/1998 | Kollarits et al. ............. 349/93 |
| 5,813,742 | A | * | 9/1998 | Gold et al. .................... 353/88 |
| 5,940,150 | A | * | 8/1999 | Faris et al. ................... 349/16 |
| 6,361,173 | B1 | * | 3/2002 | Vlahos et al. ................ 353/97 |
| 2002/0113950 | A1 | * | 8/2002 | Vlahos ........................ 353/97 |

* cited by examiner

Primary Examiner—William Dowling
(74) Attorney, Agent, or Firm—Robert A. Voigt, Jr.; Kelly K. Kordzik; Winstead Sechrest & Minick P.C.

(57) ABSTRACT

A method and system for projecting an image. An image projection system may include a sensor configured to detect the presence of an observer within a proximity of a medium, e.g., screen, window. In response to the sensor detecting the presence of an observer within a proximity of the medium, one or more portions of the medium may be switched from a transparent state to a substantially translucent state. At a substantially concurrent time as switching the one or more portions of the medium to a substantially translucent state, an image may be projected onto such portion(s). Hence, an image may be displayed in response to detecting an observer within the proximity of the medium.

14 Claims, 7 Drawing Sheets

DISPLAYING AN IMAGE BASED ON PROXIMITY OF OBSERVER

CROSS REFERENCE TO RELATED APPLICATIONS

The present application is a continuation-in-part of U.S. patent application Ser. No. 09/876,400, filed Jun. 7, 2001, entitled "Image Projection System", and now Allowed which claims priority to and the benefit of U.S. patent application Ser. No. 09/519,537, filed Mar. 6, 2000, entitled "Switchable Transparent Screens for Image Projection System." and now Allowed, All of the above applications are assigned to the common assignee of this application, and are hereby incorporated herein by reference.

TECHNICAL FIELD

The present invention relates to the field of image projection systems, and more particularly to displaying an image in response to the proximity of the observer.

BACKGROUND INFORMATION

In U.S. patent applications Ser. Nos. 09/519,537 and 09/876,400, an invention was disclosed whereby a substantially transparent medium could be used as a projection screen for capturing an image from an image projector. When the medium was not capturing an image from an image projector, its substantially transparent characteristic permitted persons to see through the medium. However, the system also provided an ability for the medium to capture an image from an image projector for viewing by persons. In one embodiment, the medium was made to have a characteristic that caused it to be nearly opaque, or substantially translucent (permitting the passage of light, but not sufficient as to be able to view objects clearly), so that persons could see clearly the image projected.

However, these image projection systems did not display an image in response to the proximity of the observer in order to capture the attention of a passerby, provide more information to the observer, etc.

Therefore, it would be desirable for an image projection system to display an image in response to the proximity of the observer.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth such as specific materials to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Figure 1:
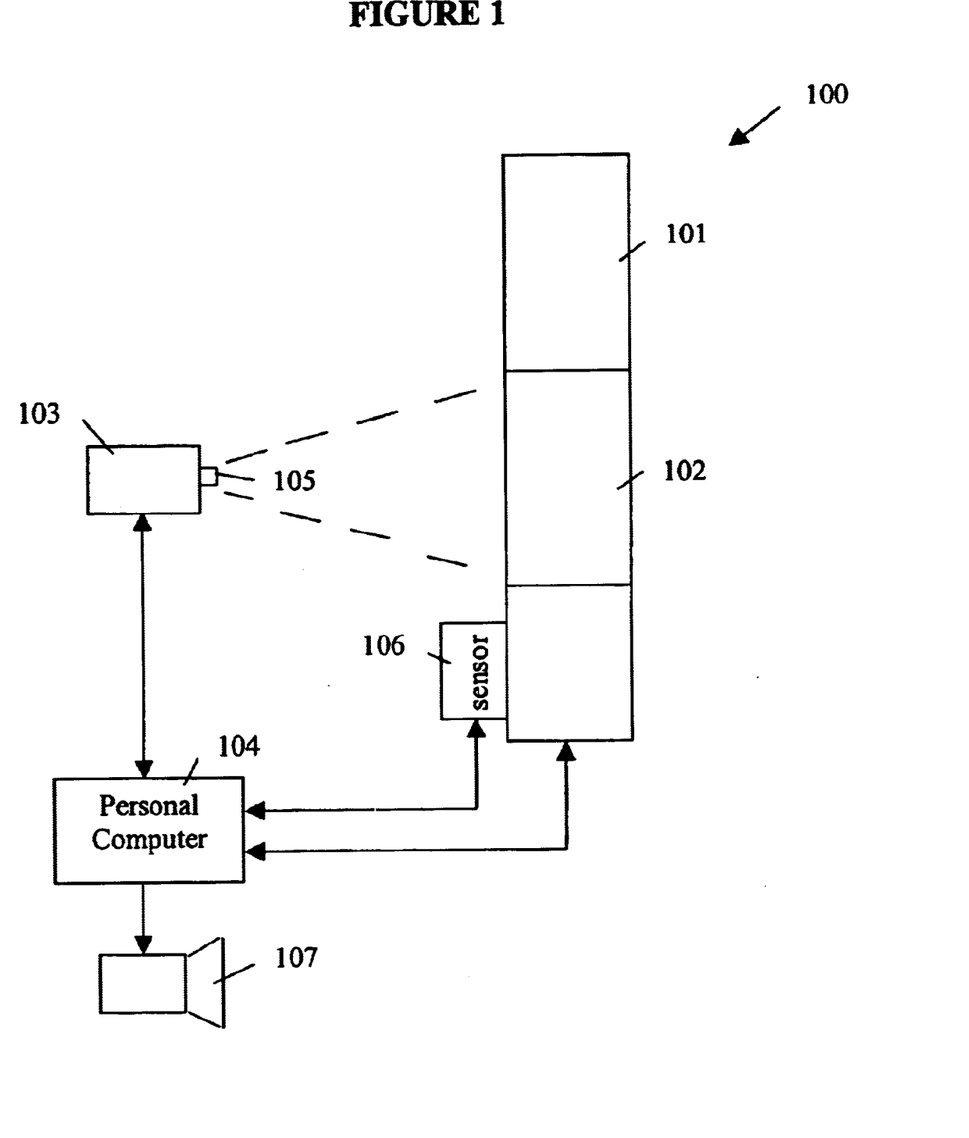
FIG. 1 illustrates an image projection system configured in accordance with the present invention.

FIG. 1—Image Projection System

FIG. 1 illustrates an embodiment of the present invention of an image projection system 100. Image projection system 100 may comprise a medium 101, e.g., projection screen, glass, window, where a portion 102 of medium 101 may be switched from a transparent state to a substantially translucent state as explained further below. It is noted that the orientation of medium 101 is exemplary and that medium 101 of image projection system 100 may be arranged in any orientation, e.g., perpendicular, horizontal. Image projection system 100 may further comprise a projector 103, e.g., Liquid Crystal Display (LCD) projector, film projector, slide projector, computer for providing computer generated images. Projector 103 may be configured to project an image at portion 102 when portion 102 is switched from a transparent state to a substantially translucent state. Portion 102 may be switched from a transparent state to a substantially translucent state when an observer, e.g., customer, passerby, is located within a proximity of medium 101 as described further below. Image projection system 100 may further comprise a Personal Computer (PC) 104 coupled to projector 102. A more detailed description of computer 104 is provided further below in conjunction with FIG. 5. Computer 104 may be configured to control what images are projected by projector 103 onto portion 102 of medium 101. Computer 104 may further be configured to control a shutter 105 on projector 102 so that projector 103 can remain continuously on, without having to be turned on and off. Image projection system 100 may further comprise a sensor 106, e.g., infrared sensor, motion sensor, coupled to medium 101 and computer 104. Sensor 106 may be configured to detect the presence of an observer within a particular distance or proximity from medium 101. As illustrated in FIG. 1, sensor 106 may be located near the bottom of medium 101. It is noted that sensor 106 may be located at any location of medium 101 and that FIG. 1 is illustrative. Furthermore, sensor 106 may be located separately from medium 101 such as on the bottom of a door. Image projection system 100 may further comprise a speaker 107 coupled to computer 104. Upon computer 104 receiving an indication from sensor 106 that the presence of an observer was detected within a particular distance or proximity of medium 101, computer 104 may output audio, e.g., song, advertisement, through speaker 107. Those skilled in the art will recognize that the structure, components, and environment illustrated in FIG. 1 are not intended to limit the present invention. Indeed, those skilled in the art will recognize that other structures, components, and environments may be used without departing from the scope of the present invention.

Figure 3:
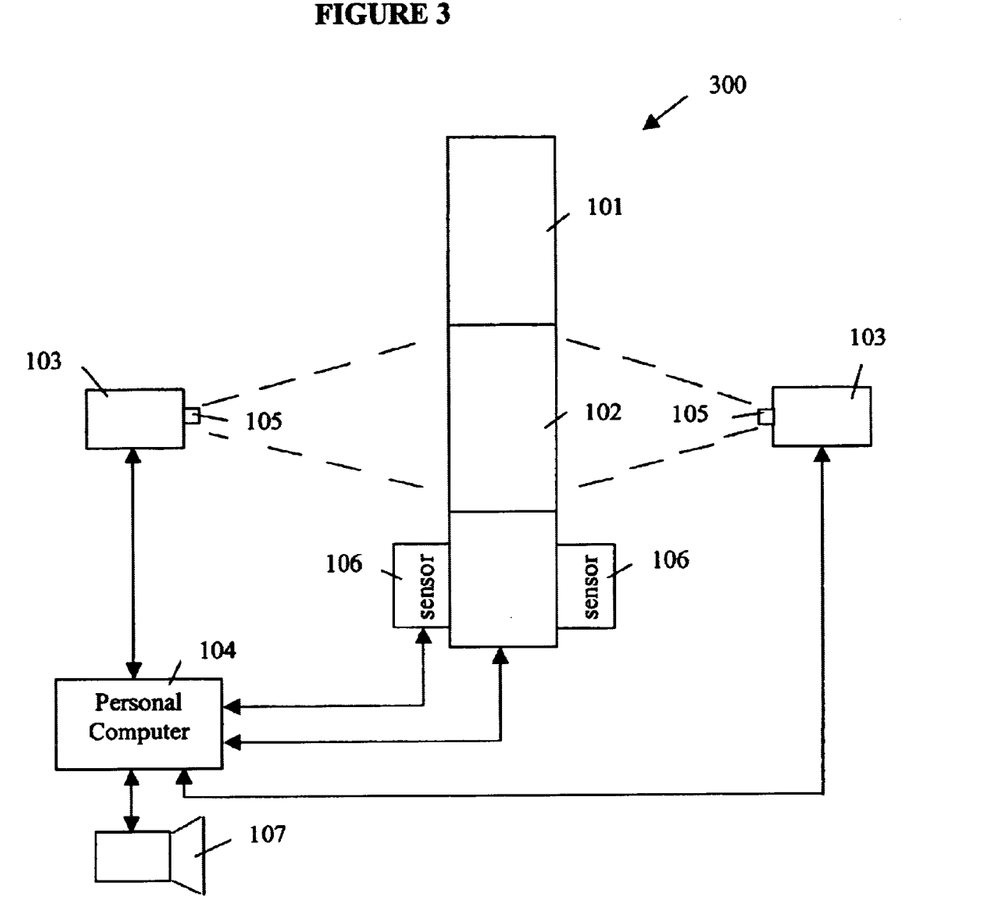
FIG. 3 illustrates an image projection system with a projector located on each side of a medium configured in accordance with the present invention.
Figure 4:
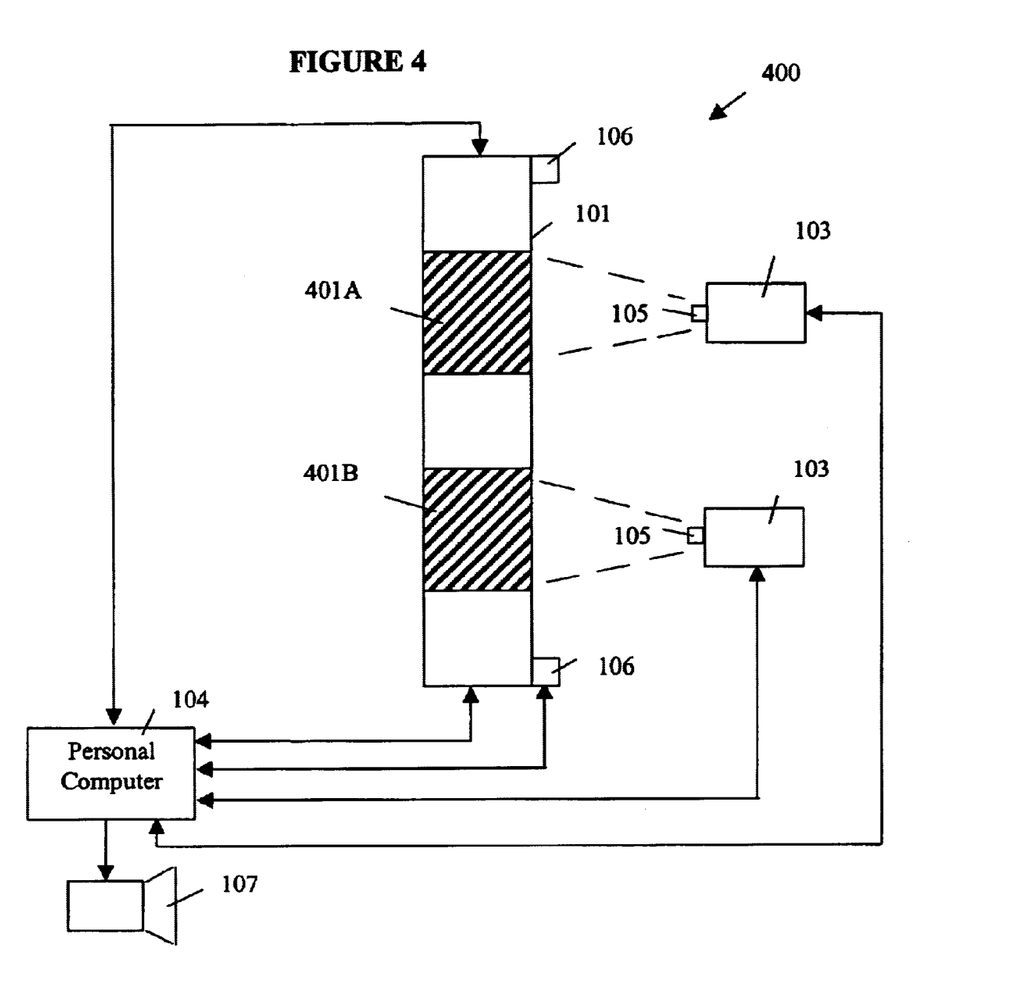
FIG. 4 illustrates an embodiment of an image projection system with multiple projectors located on one side of a medium configured in accordance with the present invention.

For example, the portion 102 of medium 101 switched from a transparent state to a substantially translucent state upon detecting the presence of an observer within a particular distance or proximity of medium 101 may be the entire medium 101. In another example, personal computer 104 may be a microcontroller. In another example, image projection system 100 may comprise multiple projectors 103 located on both sides of medium 101 thereby allowing observers on each side of medium 101 to view separate images, e.g., individual, advertisement, on medium 101 in response to the observer on each side of medium 101 being within a particular distance or proximity of medium 101 as illustrated in FIG. 3. In another example, image projection system 100 may comprise multiple projectors 103 located on one side of medium 101 thereby allowing one or more observers to view multiple images on medium 101 in response to the one or more observers being within a particular distance or proximity of medium 101 as illustrated in FIG. 4.

Referring to FIG. 1, medium 101 may be any type of transparent, e.g., glass, or semi-transparent material having one or more portions 102 that can be switched to being in a substantially translucent or opaque state. A translucent state may refer to permitting the passage of light but not sufficient as to be able to view objects beyond the medium clearly. An opaque state may refer to blocking the passage of light thereby preventing an observer from viewing objects beyond the medium. The other remaining portions of medium 101 may be transparent where an observer may be able to view objects beyond medium 101. Additional details regarding a medium 101 that contains one or more portions 102 that can be switched from a transparent state to a substantially translucent state (or even opaque) are disclosed in U.S. patent application Ser. Nos. 09/519,537; 9/876,400 and 10/981,183 entitled "Switchable Transparent Screens for Image Projection System", "Image Protection System" and "Shutter for Image Projection System", respectively, which are incorporated by reference in their entirety herein.

Portion(s) 102 or the entirety of medium 101 may be switched from a transparent state to a substantially translucent state by equipping portion(s) 102 or the entirety of medium 101 with an electrical, chemical or photosensitive material which is transparent in the absence of a stimulus, but switches to a substantially translucent or opaque state upon receipt of a particular stimulus. Examples of electrochromic, photochromic and electrophoretic materials which may be advantageously employed in this function are well known to those of ordinary skill in the art. For example, a polymer dispersed liquid crystal material as is commonly available may be sandwiched between sheets of glass or plastic in one or more portions 102 of a transparent sheet. As oriented in the standard configuration, the molecules of liquid crystal material will allow for the passage of light therethrough, i.e., the portion is transparent. However, upon application of a relatively small electrical stimulus, the molecules of liquid crystal material may be made to change their orientation, thus taking on a translucent or nearly opaque appearance and making such area of the transparent sheet suitable for the receipt of a projected image. Such switchable materials are disclosed within J. W. Doane et al., *Displays from a New Type of Liquid Crystal Microdroplet Dispersion*, IEEE, 1985 International Display Research Conference, pp. 153–154 (1985); J. W. Doane et al., *Wide-Angle-View PDLC Displays*, SID 90 DIGEST, pp. 224–226 (1990); Z. Yaniv et al., *Active Matrix Polymer Dispersed Liquid Crystal Display*, JAPAN DISPLAY, pp. 572–575 (1989), which are all incorporated by reference herein.

In one embodiment, portion(s) 102 or the entirety of medium 101 may be coated either internally or externally with a transparent conducting material such as Tin Oxide ($SnO_2$). An example of such a coating is Nanomer™ manufactured by the Institut Fur Neue Materialien (Institut Fur Neue Materialien is located at Im Stadtwald—Gebaude 43, D-66123 Saarbrucken, Germany). The coating may be applied in a grid-like fashion as illustrated in FIG. 2.

Figure 2:
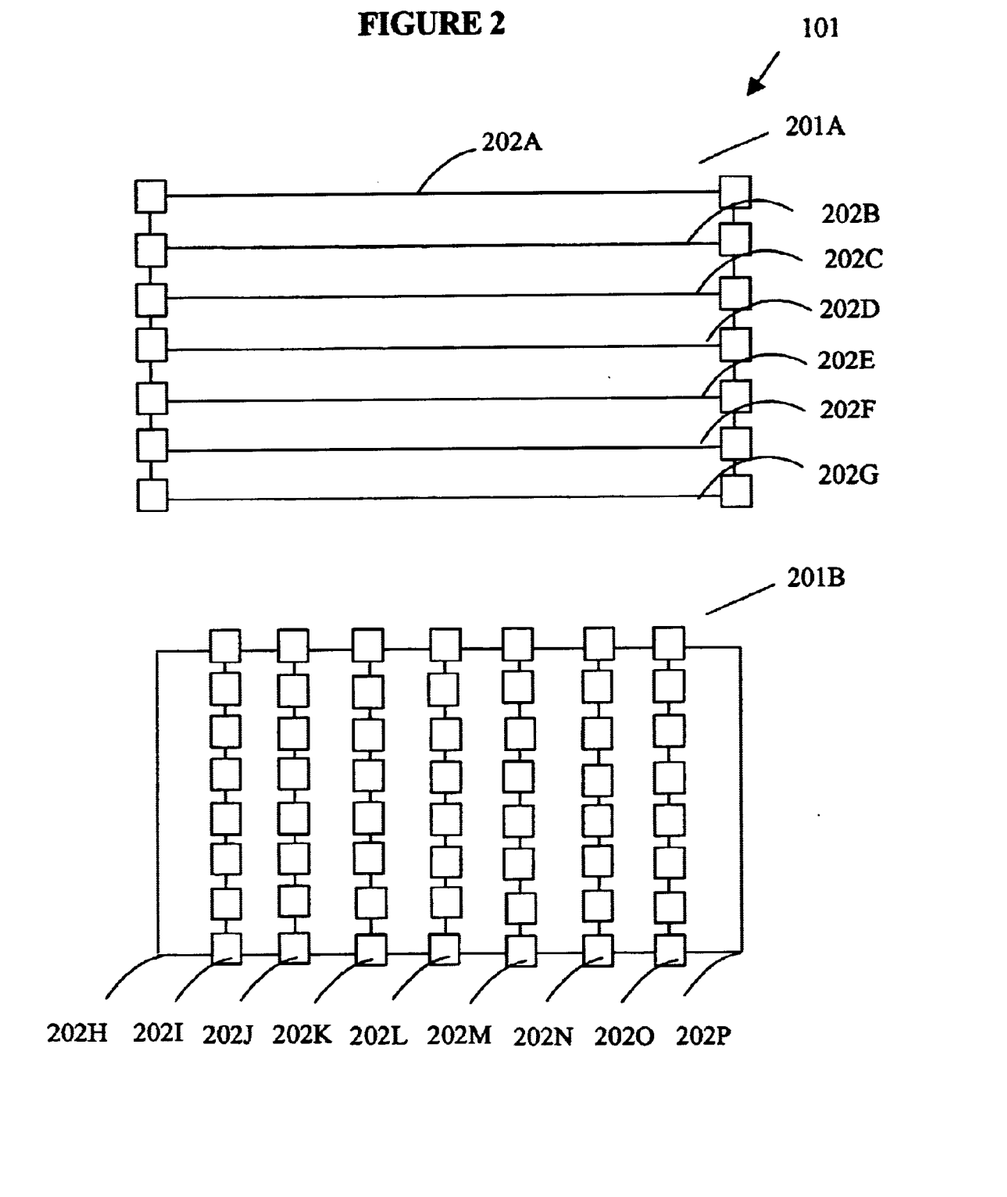
FIG. 2 illustrates an embodiment of a medium of the image projection system configured in accordance with the present invention.

Referring to FIG. 2, FIG. 2 illustrates an embodiment of medium 101 comprising layers 201A–B of glass or plastic or semi-transparent material where a plurality of stripes 202A–P of transparent coating material such as $SnO_2$ may be applied to the surfaces of layers 201A–B. Layers 201A–B may collectively or individually be referred to as layers 201 or layer 201, respectively. Stripes 202A–P may collectively or individually be referred to as stripes 202 or stripe 202, respectively. It is noted that each layer 201 may comprise any number of stripes 202 and that FIG. 2 is illustrative.

Referring to FIG. 2, the intersection of each layer 201 and stripe 202 may comprise a device (denoted by a rectangle) that may be activated by computer 104 (FIG. 1) to apply a relatively small electrical stimulus to that location. Hence, by selectively activating these devices to apply a relatively small electrical stimulus to selective locations, one or more various portions 102 (FIG. 1) or the entire medium 101 may be switched to a substantially translucent state. In an alternative embodiment, stripes 202A–P may be electrical wires that are of such a small size as to not impede viewing through medium 101.

Returning to FIG. 1, as stated above, computer 104 may be configured to control what images, e.g., advertisement, individual, are projected by projector 103 onto medium 101, and may control a shutter 105 so that projector 103 can remain continuously on, without having to be turned on and off. Computer 104 may control shutter 105 by issuing a command to projector 103 to open or close shutter 105. Furthermore, computer 104 may control what images are projected by projector 103 by transmitting the image to be projected to projector 103. Furthermore, computer 104 may be configured to issue a command to projector 103 indicating one or more locations 102 on medium 101 to project the image. An embodiment of image projection system 100 projecting one or more images onto multiple locations 102 on medium 101 is illustrated in FIG. 4 as discussed further below. Furthermore, computer 104 may be configured to selectively assert the devices (denoted by a rectangle in FIG. 2) to apply a relatively small electrical stimulus thereby forming one or more portions 102 on medium 101 that are in a substantially translucent state. In order to switch these locations back to a transparent state, computer 104 may selectively deassert these devices (denoted by a rectangle in FIG. 2) to stop applying a relatively small electrical stimulus. By stopping the application of electrical stimuli, these one or more portions 102 on medium 101 may be switched back to the transparent state.

As stated above, sensor 106 may be configured to detect the presence of an observer within a particular distance or proximity from medium 101. Upon detecting the presence of an observer within a particular distance or proximity from medium 101, sensor 106 may transmit a signal to computer 104 indicating the detection of an observer within a particular distance from medium 101. In response to such an indication, computer 104 may be configured to issue a command to projector 103 to open shutter 105 of projector 103. In a substantially concurrent manner as opening shutter 105, computer 104 may switch one or more locations 102 of medium 101 from a transparent state to a substantially translucent or opaque state as discussed above. In one embodiment, computer 104 may selectively assert the devices located internally or externally of medium 101 (denoted by a rectangle in FIG. 2) to apply a relatively small electrical stimulus thereby forming one or more locations on medium 101 that are in a substantially translucent state. Upon the opening of shutter 105, projector 103 may project the image previously received from computer 104 onto the one or more locations 102 on medium 101 as indicated by computer 104.

Furthermore, in response to receiving an indication of detecting an observer within a particular distance from medium 101, computer 104 may be configured to output audio, e.g., song, advertisement, through speaker 107.

FIG. 3—Image Projection System with a Projector Located on Both Sides of Medium

FIG. 3 illustrates an embodiment of the present invention of an image projection system 300 configured similarly as image projection system 100 (FIG. 1) except that separate images may be projected onto medium 101 by multiple projectors 103. Furthermore, image projection system 300 differs from image projection system 100 by having multiple sensors 106 to detect the presence of an observer within a particular distance or proximity of medium 101 on each side of medium 101. It is noted that the orientation of medium 101 is exemplary and that medium 101 of image projection system 300 may be arranged in any orientation, e.g., perpendicular, horizontal. It is further noted that even though the following describes projecting images on both sides of medium 101 with a perpendicular orientation that the principles of the present invention as described below apply to medium 101 with a horizontal direction. It is further noted that those skilled in the art will recognize that the structure, components, and environment illustrated in FIG. 3 are not intended to limit the present invention. Indeed, those skilled in the art will recognize that other structures, components, and environments may be used without departing from the scope of the present invention.

Referring to FIG. 3, portion 102 may be switched from a transparent state to a substantially translucent state upon detecting the presence of an observer on the left side of medium 101 within a particular distance or proximity of medium 101 by sensor 106 located on the left side of medium 101 as explained above. In a substantially concurrent manner with the switching of portion 102, projector 103 located on the left side of medium 101 may receive a command to open shutter 105 from computer 104. Upon the opening of shutter 105, projector 103 on the left side of medium 101 may project a particular image (may differ from the image projected by projector 103 located on the left side of medium 101) previously received from computer 104 onto portion 102 thereby allowing an observer of medium 101 to view the projected image.

Similarly, portion 102 may be switched from a transparent state to a substantially translucent state upon detecting the presence of an observer on the right side of medium 101 within a particular distance or proximity of medium 101 by sensor 106 located on the right side of medium 101 as explained above. In a substantially concurrent manner with the switching of portion 102, projector 103 located on the right side of medium 101 may receive a command to open shutter 105 from computer 104. Upon the opening of shutter 105, projector 103 on the right side of medium 101 may project a particular image (may differ from the image projected by projector 103 located on the left side of medium 101) previously received from computer 104 onto portion 102 thereby allowing an observer of medium 101 to view the projected image.

In the manner as described above, observers on each side of medium 101 may view separate images, e.g., individual, advertisement, on medium 101 in response to an observer being within a particular distance or proximity of medium 101.

FIG. 4—Image Projection System with Multiple Projectors Located on one Side of Medium FIG. 4 illustrates an embodiment of the present invention of image projection system 400 configured similarly as image projection system 100 (FIG. 1) except that one or more images may be projected onto multiple switchable portions 401A–B on one side of medium 101 by multiple projectors 103. Switchable portions 401A–B may collectively or individually be referred to as portions 401 or portion 401. Furthermore, image projection system 400 may differ from image projection system 100 by having multiple sensors 106 to detect the presence of an observer within a particular distance or proximity of medium 101 on either or both sides of medium 101. It is noted that the orientation of medium 101 is exemplary and that medium 101 of image projection system 400 may be arranged in any orientation, e.g., perpendicular, horizontal. It is further noted that even though the following describes projecting an image on both sides of medium 101 with a perpendicular orientation that the principles of the present invention as described below apply to medium 101 with a horizontal direction. It is further noted that those skilled in the art will recognize that the structure, components and environment illustrated in FIG. 4 are not intended to limit the present invention. Indeed, those skilled in the art will recognize that other structures, components and environments may be used without departing from the scope of the present invention.

Referring to FIG. 4, sensor 106 located at the top of medium 101 may be configured to detect the presence of an observer within a particular distance from portion 401A of medium 101. Upon detecting the presence of an observer within a particular distance from portion 401A of medium 101, sensor 106 located at the top of medium 101 may transmit a signal to computer 104 to indicate that an observer was detected being with a particular distance from portion 401A of medium 101. Portion 401A may be switched from a transparent state to a substantially translucent state by computer 104 upon receiving the indication of an observer being with a particular distance from portion 401A. In a substantially concurrent manner with the switching of portion 401A, the top projector 103 may receive a command to open shutter 105 from computer 104. Upon the opening of shutter 105, the top projector 103 may project the image previously received from computer 104 onto portion 401A thereby allowing an observer on both sides of medium 101 to view the projected image at portion 401A.

Similarly sensor 106 located at the bottom of medium 101 may be configured to detect the presence of an observer within a particular distance from portion 401B of medium 101. Upon detecting the presence of an observer within a particular distance from portion 401B of medium 101, sensor 106 located at the bottom of medium 101 may transmit a signal to computer 104 to indicate that an observer was detected being with a particular distance from portion 401B of medium 101. Portion 401B may be switched from a transparent state to a substantially translucent state by computer 104 upon receiving the indication of an observer being with a particular distance from portion 401B. In a substantially concurrent manner with the switching of portion 401B, the bottom projector 103 may receive a command to open shutter 105 from computer 104. Upon the opening of shutter 105, the bottom projector 103 may project the image previously received from computer 104 onto portion 401B thereby allowing an observer on both sides of medium 101 to view the projected image at portion 401B.

It is noted that image processing system 400 may only comprise a single sensor 106 instead of multiple sensors 106 to detect an observer within a particular distance from either portion 401A or portion 401B of medium 101. The single sensor 106 may be configured to transmit a signal to computer 104 indicating whether an observer is within a particular distance from either portion 401A or portion 401B. It is further noted that the top and bottom projectors 103 may be configured to project the same or different images. It is further noted that either the same or different observers may trigger the top and bottom sensors 106.

Figure 5:
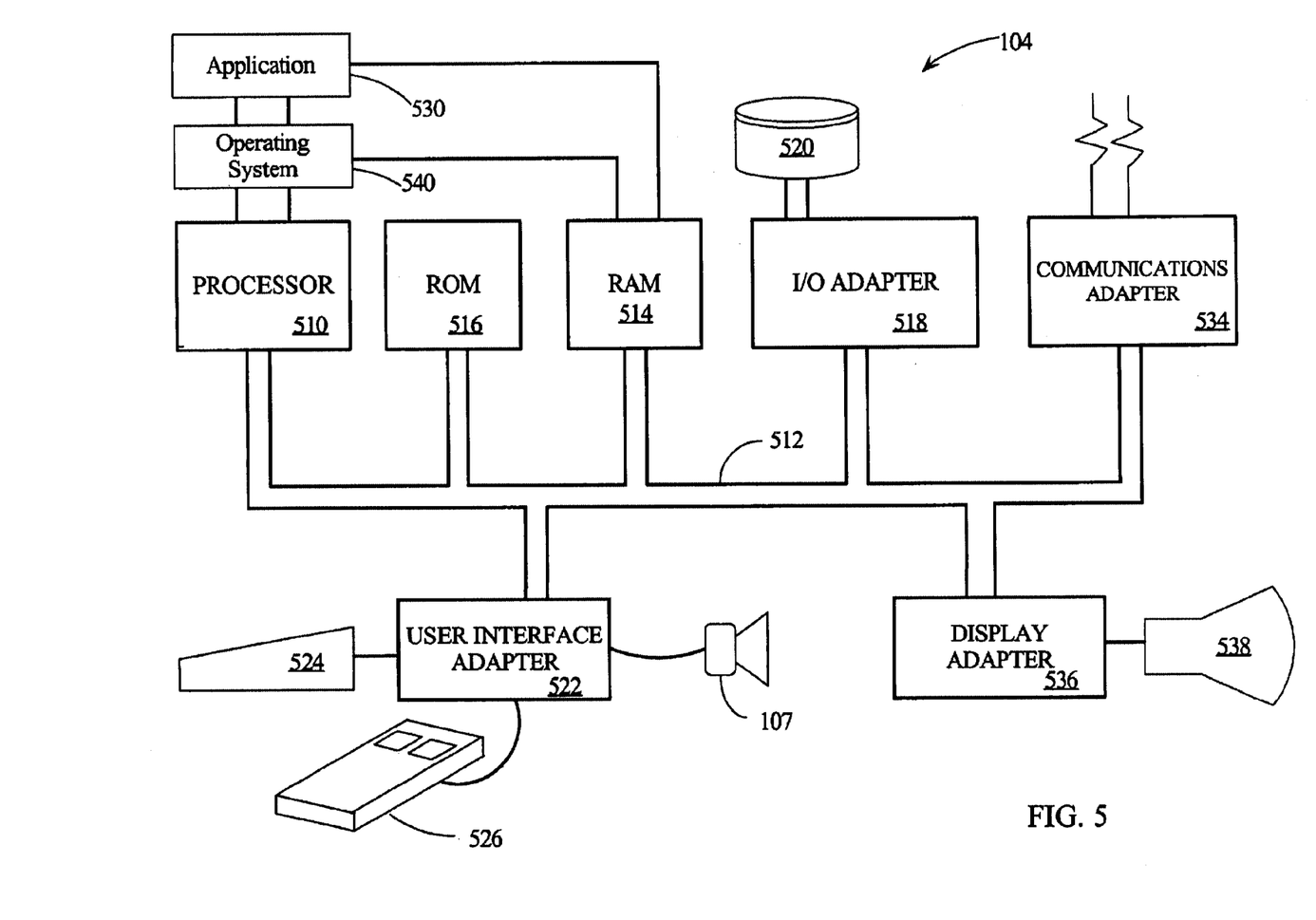
FIG. 5 illustrates an embodiment of the present invention of a computer system.

FIG. 5—Hardware Configuration of Personal Computer

FIG. 5 illustrates a typical hardware configuration of personal computer 104 (FIGS. 1, 3 and 4) which is representative of a hardware environment for practicing the present invention. Computer 104 may have a central processing unit (CPU) 510 coupled to various other components by system bus 512. An operating system 540, may run on CPU 510 and provide control and coordinate the functions of the various components of FIG. 5. An application 550 in accordance with the principles of the present invention may run in conjunction with operating system 540 and provide calls to operating system 540 where the calls implement the various functions or services to be performed by application 550. Application 550 may include, for example, a program for projecting an image onto portion 102 (FIGS. 1 and 3), portion 401 (FIG. 4) of medium 101 (FIGS. 1, 3 and 4) in response to an observer, e.g., customer, being within a particular distance of medium 101 as discussed in FIG. 6, a program for outputting audio to speaker 107 (FIGS. 1, 3 and 4) in response to an observer, e.g., customer, being within a particular distance of medium 101 as discussed in FIG. 7. Read-Only Memory (ROM) 516 may be coupled to system bus 512 and include a Basic Input/Output System ("BIOS") that controls certain basic functions of computer 104. Random access memory (RAM) 514 and Input/Output (I/O) adapter 518 may also be coupled to system bus 512. It should be noted that software components including operating system 540 and application 550 may be loaded into RAM 514 which may be computer's 104 main memory for execution. I/O adapter 518 may be a small computer system interface ("SCSI") adapter that communicates with a disk unit 520, e.g., disk drive. It is noted that the program of the present invention that projects an image onto portion 102 (FIGS. 1 and 3), portion 401 (FIG. 4) of medium 101 (FIGS. 1, 3 and 4) in response to an observer, e.g., customer, being within a particular distance of medium 101, as discussed in FIG. 6, may reside in disk unit 520 or in application 550. It is further noted that the program of the present invention that outputs audio to speaker 107 in response to an observer, e.g., customer, being within a particular distance of medium 101, as discussed in FIG. 7, may reside in disk unit 520 or in application 550.

Referring to FIG. 5, computer 104 may further comprise a communications adapter 534 coupled to bus 512. Communications adapter 534 may enable computer 104 to communicate with sensor 106 (FIGS. 1, 3 and 4), speaker 107 and projector 103 (FIGS. 1, 3 and 4). I/O devices may also be connected to system bus 512 via a user interface adapter 522 and a display adapter 536. Keyboard 524, mouse 526 and speaker 107 may all be interconnected to bus 512 through user interface adapter 522. Event data may be inputted to computer 104 through any of these devices. A display monitor 538 may be connected to system bus 512 by display adapter 536. In this manner, a user is capable of inputting to computer 104 through keyboard 524 or mouse 526 and receiving output from computer 104 via display 538.

Implementations of the invention include implementations as a computer system programmed to execute the method or methods described herein, and as a computer program product. According to the computer system implementations, sets of instructions for executing the method or methods are resident in RAM 514 of one or more computer systems configured generally as described above. Until required by computer 104, the set of instructions may be stored as a computer program product in another computer memory, for example, in disk drive 520 (which may include a removable memory such as an optical disk or floppy disk for eventual use in disk drive 520). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 6:
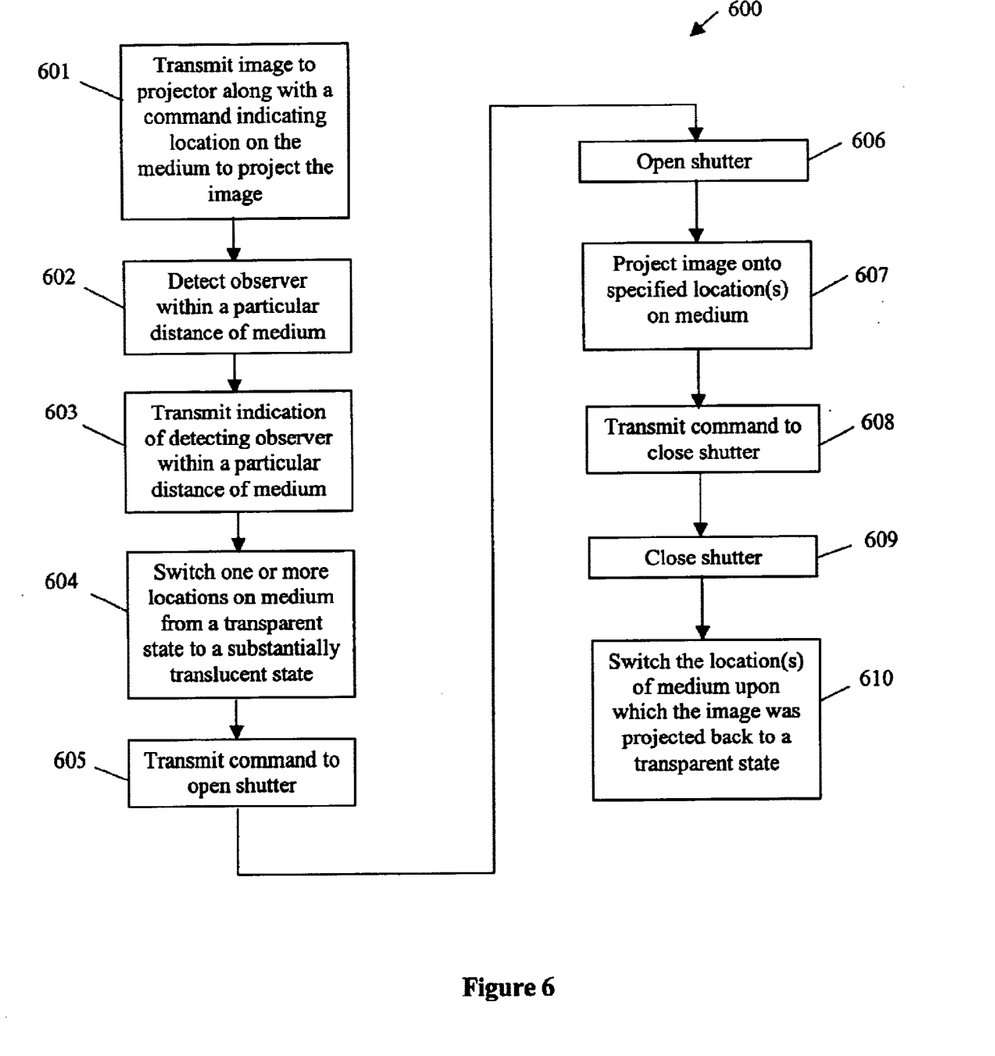
FIG. 6 is a flowchart of a method for projecting an image on a medium in response to an observer being within a proximity of the medium.

FIG. 6—Method for Projecting an Image onto a Medium in Response to an Observer Being Within a Proximity of the Medium FIG. 6 is a flowchart of one embodiment of the present invention of a method 600 for projecting an image onto a medium, e.g., projector screen, window, in response to detecting an observer, e.g., customer, passerby, being within a proximity of the medium.

Referring to FIG. 6, in conjunction with FIGS. 1–4, in step 601, computer 104 may transmit an image, e.g., advertisement, an individual, to projector 103, along with a command indicating the one or more portions 102, portion 401 on medium 101 to project the image.

In step 602, sensor 106 may detect an observer located within a particular distance or proximity of medium 101.

In step 603, upon detecting an observer located within a particular distance or proximity of medium 101, sensor 106 may transmit an indication to computer 104 that sensor 106 detected an observer located within a particular distance or proximity of medium 101

In response to receiving an indication that an observer was detected being within a particular distance or proximity of medium 101, computer 104, in step 604, may switch one or more portions 102, 401, of medium 101 from a transparent state to a substantially translucent or opaque state as discussed above. In one embodiment, computer 104 may selectively assert the devices located internally or externally of medium 101 (denoted by a rectangle in FIG. 2) to apply a relatively small electrical stimulus thereby forming one or more portions 102, 401 on medium 101 that are in a substantially translucent state.

In a substantially concurrent manner with switching portion(s) 102, 401, of medium 101 from a transparent state to a substantially translucent, computer 104 may issue a command to projector 103 to open shutter 105 in step 605. Upon projector 103 opening its shutter 105 in step 606, projector 103, in step 607, may project the image received from computer 104 onto portion(s) 102, 401 on medium 101 as indicated by computer 104 at a substantially concurrent time as switching portion(s) 102, 401 of medium 101 in step 604.

At a later point in time, in step 608, computer 104 may issue a command to projector 103 to close shutter 105. Upon receiving the command, projector 103 may close its shutter 105 in step 609 thereby stopping projection of the image. At a substantially concurrent time as closing shutter 105, computer 104, in step 610, may switch the one or more portions 102, 401 of medium 101 upon which the image was projected back to a transparent state. In one embodiment, computer 104 may selectively deassert the devices located internally or externally of medium 101 (denoted by a rectangle in FIG. 2) to stop applying a relatively small electrical stimulus thereby switching the one or more locations of medium 101 upon which the image was projected back to a transparent state.

It is noted that method 600 may be executed in a different order presented and that the order presented in the discussion of FIG. 6 is illustrative. It is further noted that certain steps, e.g., steps 604–607 and 608–610 in FIG. 6, may be executed almost concurrently. It is further noted that steps 601, 604–605, 608 and 610 may be implemented by a program in computer 104 residing in application 550 (FIG. 5) or in disk unit 520 (FIG. 5). It is further noted that steps 602–603 may be implemented by sensor 106. It is further noted that steps 606–607 and 609 may be implemented by projector 103.

Figure 7:
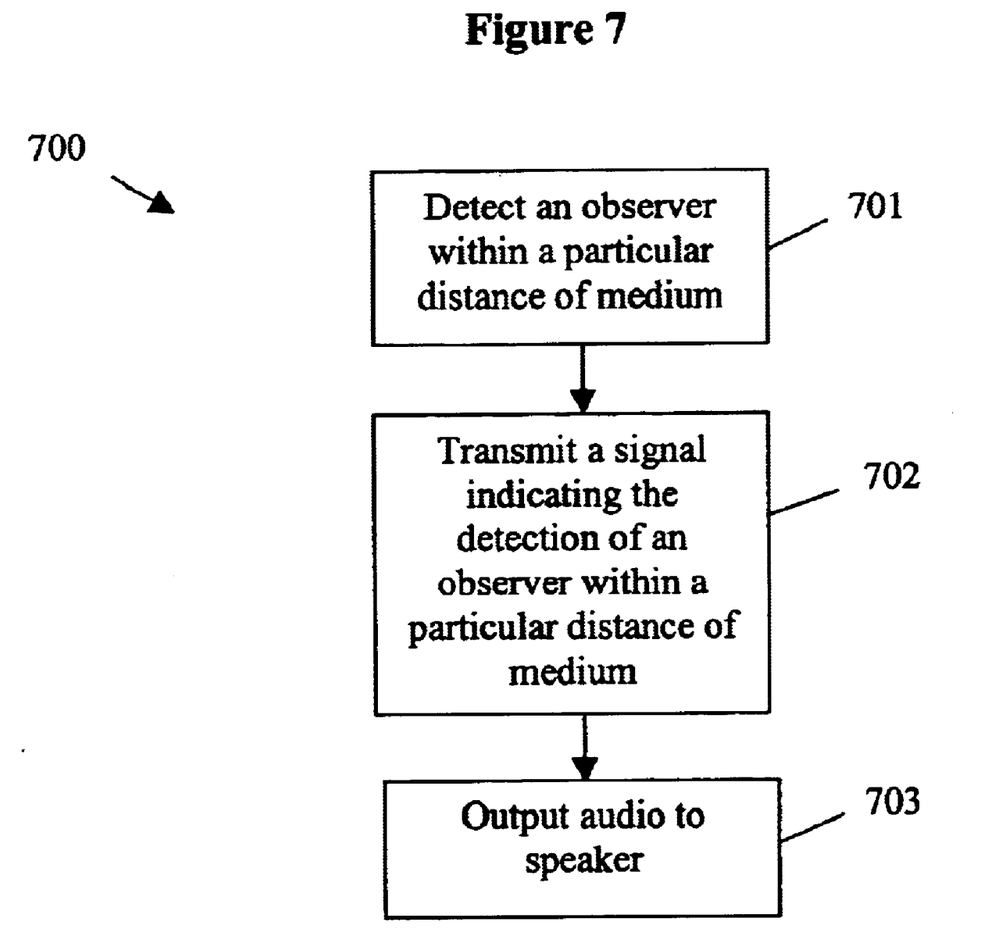
FIG. 7 is a flowchart of a method for outputting audio to a speaker in response to an observer being within a proximity of the medium in accordance with the present invention.

FIG. 7—Method for Outputting Audio to a Speaker in Response to an Observer Being Within a Proximity of the Medium FIG. 7 is a flowchart of one embodiment of the present invention of a method for outputting audio to a speaker based on detecting the presence of an observer, e.g., customer, passerby, within a proximity of medium 101, e.g., projection screen, window.

Referring to FIG. 7, in conjunction with FIGS. 1, 3 and 4, in step 701, sensor 106, e.g., infrared sensor, may detect the presence of an observer, e.g., customer, passerby, within a particular distance or proximity of medium 101.

In step 702, sensor 106 may transmit a signal indicating the detection of an observer within a proximity or particular distance of medium 101 to computer 104.

In response to such an indication, computer 104, in step 703, may output audio, e.g., song, advertisement, through speaker 107.

It is noted that method 700 may be executed in a different order presented and that the order presented in the discussion of FIG. 7 is illustrative. It is further noted that certain steps in FIG. 7 may be executed almost concurrently. It is further noted that steps 701–702 may be implemented by sensor 106. It is further noted that step 703 may be implemented by a program in computer 104 residing in application 550 (FIG. 5) or in disk unit 520 (FIG. 5).

Although the system, computer program product and method are described in connection with several embodiments, it is not intended to be limited to the specific forms set forth herein; but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for projecting an image comprising the steps of:
   detecting an observer within a proximity of a medium;
   switching a location on said medium from a transparent state to a substantially translucent state in response to detecting said observer within said proximity of said medium; and
   projecting an image onto said location at a substantially concurrent time as switching said location on said medium to said substantially translucent state.

2. The method as recited in claim 1 further comprising the step of:
   outputting audio to a speaker in response to detecting said observer within said proximity of said medium.

3. The method as recited in claim 1 further comprising the steps of:
   transmitting said image to a projector; and
   transmitting a command to said projector indicating said location to project said image.

4. The method as recited in claim 1 further comprising the steps of:
   transmitting a command to close a shutter of a projector; and
   switching said location upon which said image was projected back to said transparent state at a substantially concurrent time as closing said shutter of said projector.

5. An image projection system, comprising:
   a medium;
   a projector for projecting an image onto said medium;
   a computer coupled to said medium and said projector; and
   a sensor coupled to said computer, wherein said sensor is configured to detect an observer within a proximity of said medium, wherein said sensor upon detecting said observer within said proximity of said medium transmits an indication of detecting said observer within said proximity of said medium to said computer;
   wherein said computer comprises:
      a memory unit operable for storing a computer program for projecting an image onto said medium; and
      a processor coupled to said memory unit, wherein said processor, responsive to said computer program, comprises:
         circuitry operable for switching a location on said medium from a transparent state to a substantially translucent state in response to receiving said indication of detecting said observer within said proximity of said medium; and
         circuitry operable for transmitting a command to open a shutter of said projector at a substantially concurrent time as switching said location on said medium to said substantially translucent state;
   wherein said projector projects an image onto said location at a substantially concurrent time as switching said location on said medium to said substantially translucent state.

6. The image projection system as recited in claim 5, wherein said processor further comprises:
   circuitry operable for outputting audio to a speaker in response to detecting said observer within said proximity of said medium.

7. The image projection system as recited in claim 5, wherein said processor further comprises:
   circuitry operable for transmitting said image to said projector; and
   circuitry operable for transmitting a command to said projector indicating said location to project said image.

8. The image projection system as recited in claim 5, wherein said processor further comprises:
   circuitry operable for transmitting a command to close said shutter of said projector; and
   circuitry operable for switching said location upon which said image was projected back to said transparent state at a substantially concurrent time as closing said shutter of said projector.

9. An image projection system, comprising:
a medium comprising a location configurable to switch from a transparent state to a substantially translucent state in response to detecting an observer within a proximity of said medium; and
a projector for projecting an image onto said location in response to detecting said observer within said proximity of said medium.

10. The image projection system as recited in claim 9 further comprises:
a computer coupled to said medium and said projector; and
a sensor coupled to said computer, wherein said sensor is configured to detect said observer within said proximity of said medium, wherein said sensor upon detecting said observer within said proximity of said medium transmits an indication of detecting said observer within said proximity of said medium to said computer.

11. The image projection system as recited in claim 10, wherein said computer comprises:
a memory unit operable for storing a computer program for projecting said image onto said medium; and
a processor coupled to said memory unit, wherein said processor, responsive to said computer program, comprises:
circuitry operable for switching said location on said medium from said transparent state to said substantially translucent state in response to receiving said indication of detecting said observer within said proximity of said medium; and
circuitry operable for transmitting a command to open a shutter of said projector at a substantially concurrent time as switching said location on said medium to said substantially translucent state.

12. The image projection system as recited in claim 11, wherein said processor further comprises:
circuitry operable for outputting audio to a speaker in response to detecting said observer within said proximity of said medium.

13. The system as recited in claim 11, wherein said processor further comprises:
circuitry operable for transmitting said image to said projector; and
circuitry operable for transmitting a command to said projector indicating said location to project said image.

14. The system as recited in claim 11, wherein said processor further comprises:
circuitry operable for transmitting a command to close said shutter of said projector; and
circuitry operable for switching said location upon which said image was projected back to said transparent state at a substantially concurrent time as closing said shutter of said projector.

* * * * *

UNITED STATES PATENT AND TRADEMARK OFFICE
CERTIFICATE OF CORRECTION

PATENT NO. : 6,616,284 B2
DATED : September 9, 2003
INVENTOR(S) : Zvi Yaniv and Michael C. Sweaton It is certified that error appears in the above-identified patent and that said Letters Patent is hereby corrected as shown below:

Title page,
Item [63], Related U.S. Application Data, please insert the following after "Jun. 7, 2001"
-- , which is a continuation-in-part of U.S. Serial No. 09/519,537 filed March 6, 2000, now U.S. Patent No. 6,577,355 --

Column 1,
Line 11, following "tem" please replace "." with -- , --.
Line 11, following "Allowed" please replace "," with -- . --.

Signed and Sealed this

Twentieth Day of January, 2004

JON W. DUDAS
*Acting Director of the United States Patent and Trademark Office*